Aug. 30, 1927.
S. H. CAMPBELL
1,640,819
RETAINING VALVE BRACKET
Filed Feb. 23, 1927
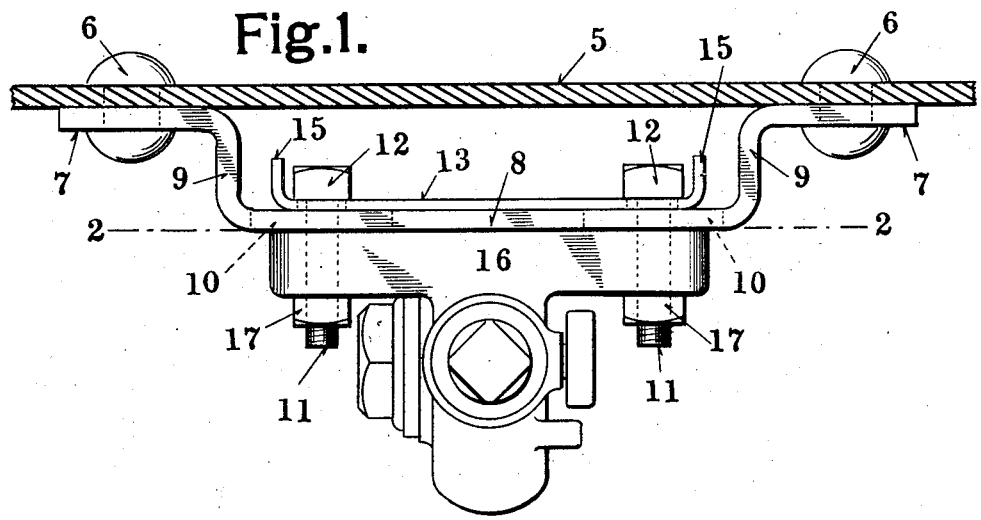
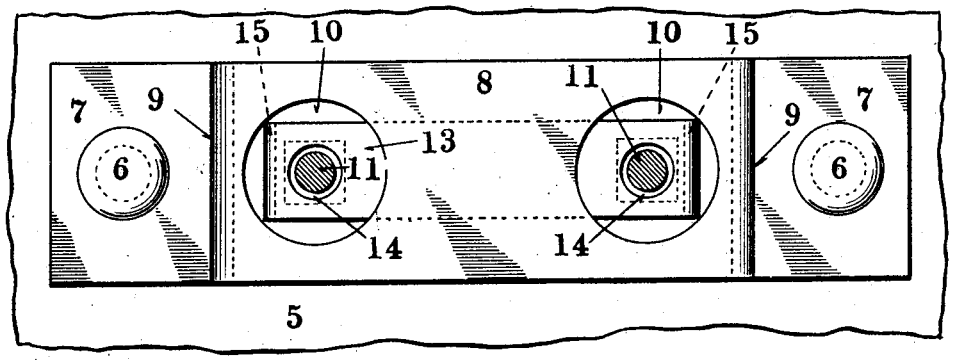
INVENTOR
S. H. CAMPBELL
BY
ATTORNEY Patented Aug. 30, 1927.

1,640,819

UNITED STATES PATENT OFFICE.

STERLING H. CAMPBELL, OF ST. LOUIS, MISSOURI, ASSIGNOR TO WESTERN RAILWAY EQUIPMENT COMPANY, OF ST. LOUIS, MISSOURI, A CORPORATION OF MISSOURI.

RETAINING-VALVE-BRACKET.

Application filed February 23, 1927. Serial No. 170,184.

My invention relates to a retaining valve bracket and has for its object the provision of means independent of the bracket itself for engaging the heads of the bolts holding the retaining valve and thus preventing their rotation.

In the accompanying drawings, which illustrate one form of retaining valve bracket made in accordance with my invention, Figure 1 is a top plan view of the bracket together with a valve held thereby and a portion of a car to which it is attached, and Figure 2 is a section taken on the line 2—2 of Figure 1.

Secured to the end of the car 5 by rivets 6 is a plate of metal forming the holder and comprising ends 7 having holes for the rivets, and a central part 8 held some distance from the car end by bends 9. Formed in the central part 8 of the bracket are a pair of openings 10 for the passage of bolts 11. These openings 10, which may be circular, as shown, or of any other suitable shape, are of large size relative to the diameter of the bolts 11. These openings thus allow ample adjustment of the bolts relative to the bracket both vertically and laterally but will not prevent the passage of the bolt heads 12 through the bracket.

A strap 13 having bolt holes 14 only slightly larger than the diameter of the bolts is positioned against the rear face of the central part 8 of the bracket and not only prevents the passage of the bolt heads through the bracket but also the rotation of the bolts. This latter function is accomplished by wings 15 formed by bending over the ends of the strap 13 and so positioned with respect to the holes 14 that they will engage with the corners of the bolt heads and prevent the rotation of the bolt in any position which the latter may occupy in the bolt hole. The bolts pass through holes in the lugs of a retaining valve 16 which is clamped in position against the bracket by nuts 17 on the bolts.

The slight difference between the diameter of the bolts and the holes 14 allow the necessary adjustment between the bolts to compensate for variation in the distance between the bolt holes in the valve lugs while the fact that the strap 13 is bodily movable with respect to the bracket permits ample longitudinal and lateral adjustment of the valve relative to the holder.

The large size of the openings 10 results in another advantage i. e. the valve is not held with absolute rigidity but has a certain amount of resilience owing to the spring of the relatively thin strap 13. This resilience reduces the tendency of vibration to break off the pipe to which the valve is attached or to loosen the joint between the valve and pipe.

Having fully described my invention, what I claim as new and desire to secure by Letters Patent of the United States is:

1. In a device of the class described, the combination with a bracket adapted to be secured to a car, of a member carried by said bracket and capable of bodily movement relative thereto, openings in said member, and bolts passing through said openings, said bolts being adapted to engage and secure a retaining valve.

2. In a device of the class described, the combination with a bracket adapted to be secured to a car and having a part spaced therefrom, of a member positioned at the rear of said part and capable of bodily movement relative thereto, openings in said member, and bolts passing through said openings, said bolts being adapted to engage and secure a retaining valve.

3. In a device of the class described, the combination with a bracket adapted to be secured to a car and having a part spaced therefrom, openings in said spaced part, a member arranged behind said part and provided with bolt holes smaller than said openings, and bolts passing through said bolt holes and adapted to secure a retaining valve in position.

4. In a device of the class described, the combination with a bracket adapted to be secured to a car and having a part spaced therefrom, openings in said spaced part, a member arranged behind said part and provided with bolt holes smaller than said openings, bolts passing through said bolt holes and adapted to secure a retaining valve in position, and projections on said member and engaging the heads of the bolts to prevent rotation.

5. In a device of the class described, the combination with a bracket adapted to be secured to a car and having a part spaced therefrom, openings in said spaced part, a strap arranged behind said part and provided with bolt holes smaller than said openings, and bolts passing through said bolt holes and adapted to secure a retaining valve in position, said strap having bent over ends forming wings to engage the heads of the bolts and prevent their rotation.

6. In a device of the class described, the combination with a bracket adapted to be secured to a car and having a part spaced therefrom, of a strap arranged behind said part and provided with bolt holes, and bolts passing through said holes and adapted to secure a retaining valve in position, said strap being out of contact with the bracket adjacent to said bolts whereby the spring of the strap provides a resilient fastening for the valve.

In testimony whereof, I hereunto affix my signature, this 19th day of February, 1927.

STERLING H. CAMPBELL.